United States Patent
Gardner

(10) Patent No.: US 8,459,598 B2
(45) Date of Patent: Jun. 11, 2013

(54) PIPE HANGER

(75) Inventor: Michael A. Gardner, Hudson, OH (US)

(73) Assignee: Halex Co./Scott-Fetzer Company, Cleveland, OH (US)

(*) Notice: Subject to any disclaimer, the term of this patent is extended or adjusted under 35 U.S.C. 154(b) by 221 days.

(21) Appl. No.: 12/759,924

(22) Filed: Apr. 14, 2010

(65) Prior Publication Data

US 2010/0264277 A1   Oct. 21, 2010

Related U.S. Application Data

(60) Provisional application No. 61/169,056, filed on Apr. 14, 2009.

(51) Int. Cl.
*E21F 17/02* (2006.01)
(52) U.S. Cl.
USPC .......................... 248/58; 248/74.1; 248/74.3
(58) Field of Classification Search
USPC ............... 248/58, 610, 62, 74.1, 74.2, 74.3
See application file for complete search history.

(56) References Cited

U.S. PATENT DOCUMENTS

| | | | | |
|---|---|---|---|---|
| 2,375,513 A | * | 5/1945 | Bach | 248/59 |
| 4,119,285 A | * | 10/1978 | Bisping et al. | 248/72 |
| 4,260,123 A | * | 4/1981 | Ismert | 248/74.1 |
| 4,662,590 A | * | 5/1987 | Hungerford, Jr. | 248/72 |
| 5,667,181 A | * | 9/1997 | van Leeuwen et al. | 248/343 |
| 6,354,543 B1 | * | 3/2002 | Paske | 248/68.1 |
| 6,494,415 B1 | * | 12/2002 | Roth | 248/74.1 |
| 6,511,028 B1 | * | 1/2003 | Gretz | 248/222.52 |
| 7,661,634 B2 | * | 2/2010 | Thompson | 248/74.3 |
| 2007/0101551 A1 | * | 5/2007 | Thompson | 24/16 PB |

OTHER PUBLICATIONS

Halex Product Brochure 2008.

* cited by examiner

*Primary Examiner* — Anita M King
(74) *Attorney, Agent, or Firm* — Roger D. Emerson; Emerson Thomson Bennett

(57) ABSTRACT

A pipe hanger may include a suspending portion with a body and two flanges that extend outwardly from the body and are positional onto projections of a support structure to suspend the pipe hanger from the support structure without the use of fasteners.

7 Claims, 11 Drawing Sheets

PIPE HANGER

This application claims priority to U.S. Ser. No. 61/169,056, entitled HANGER FOR CONDUIT AND THE LIKE, filed Apr. 14, 2009, which is incorporated herein by reference.

I. BACKGROUND OF THE INVENTION

A. Field of Invention

The invention generally relates to methods and apparatuses concerning hangers used to support pipes, conduits, cables, and the like, to joists, rafters, trusses and other building structural support members of the like.

B. Description of the Related Art

Often, pipes, conduits, cables, wires, and similar objects extend along a structure, such as, for example, a ceiling, rafters, joists, beams, trusses, or struts, and are suspended or supported to such support structures with fasteners and/or straps. FIG. 11 shows a known pipe hanger 500 which includes a supporting surface 502 and a pair of arms 504 that extend from the supporting surface 502. A bolt or other fastener (not shown) is inserted through hole 506 formed in the supporting surface 502 to attach the conduit hanger 500 to the support structure. An object such as a pipe, conduit or the like is then inserted between the arms 504 and another fastener, bolt 508, is tightened to hold the object within the arms 504.

While known pipe hangers generally work well for their intended purposes, the use of fasteners may prove to be inconvenient and tedious. Further, fasteners may damage the object being suspended or the suspending structure. Accordingly, there is a need to provide a more efficient means of supporting pipe, conduit, cable, and the like.

II. SUMMARY OF THE INVENTION

According to one embodiment of this invention, a pipe hanger may be used with an associated support structure that comprises first and second laterally spaced and inwardly extending projections each having an upper surface. The pipe hanger may comprise: a suspending portion comprising: a body; and, first and second flanges that extend outwardly from the body and are positional onto the upper surfaces of the projections to suspend the pipe hanger from the associated structure without the use of fasteners; and, a retaining portion supported to the body and comprising at least a first segment that supports at least a first associated object to the associated support structure.

According to another embodiment of this invention, a method may comprise the steps of: (A) providing a support structure comprising: first and second laterally spaced and inwardly extending projections each having an upper surface; (B) providing a pipe hanger comprising: a suspending portion comprising a body and first and second flanges that extend outwardly from the body; and, a retaining portion supported to the body; (C) positioning the first and second flanges onto the upper surfaces of the first and second projections respectively to suspend the pipe hanger from the support structure without the use of fasteners; and, (D) inserting an object into the retaining portion to support the object to the support structure.

According to yet another embodiment of this invention, a pipe hanger may be used with an associated support structure that comprises first and second laterally spaced and inwardly extending projections. The pipe hanger may comprise: a suspending portion comprising: a body; first and second flanges that extend outwardly from the body; and, third and fourth flanges that extend outwardly from the body and below the first and second flanges respectively to define first and second recesses therebetween, wherein the first and second recesses receive the first and second projections of the associated support structure to suspend the pipe hanger from the associated structure without the use of fasteners; a retaining portion supported to the body and comprising first and second segments that together form an aperture that receives the first associated object, wherein the first and second segments are adjustably connectable to each other to adjust the size of the aperture to accommodate different sized associated objects; and, wherein the first segment comprises a receptor and the second segment comprises a plurality of teeth that are adjustably connectable to the receptor; and, an extension portion attached to the body and positioned between the suspending portion and the retaining portion.

One advantage of this invention is that pipe and other such objects can be easily suspended from support structures without the use of fasteners.

Another advantage of this invention is that a pipe hanger can be easily adjusted to support pipes, conduits, and the like of varying sizes.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiment of which will be described in detail in this specification and illustrated in the accompanying drawings which form a part hereof and wherein.

IV. DETAILED DESCRIPTION

Figure 1:
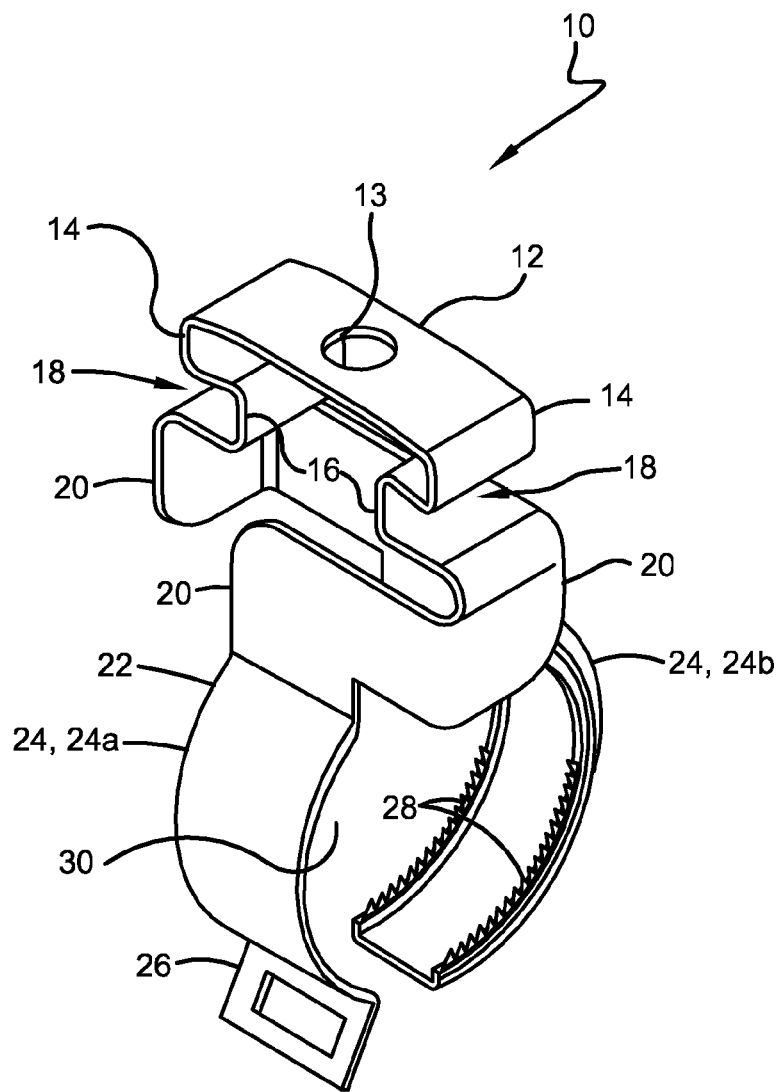
FIG. 1 is a perspective view of a pipe hanger in accordance with an embodiment of the present invention.

Referring now to the drawings wherein the showings are for purposes of illustrating embodiments of the invention only and not for purposes of limiting the same, and wherein like reference numerals are understood to refer to like components, FIG. 1 shows a pipe hanger 10 that generally comprises a suspending portion 12 and a retaining portion 22.

Figure 2:
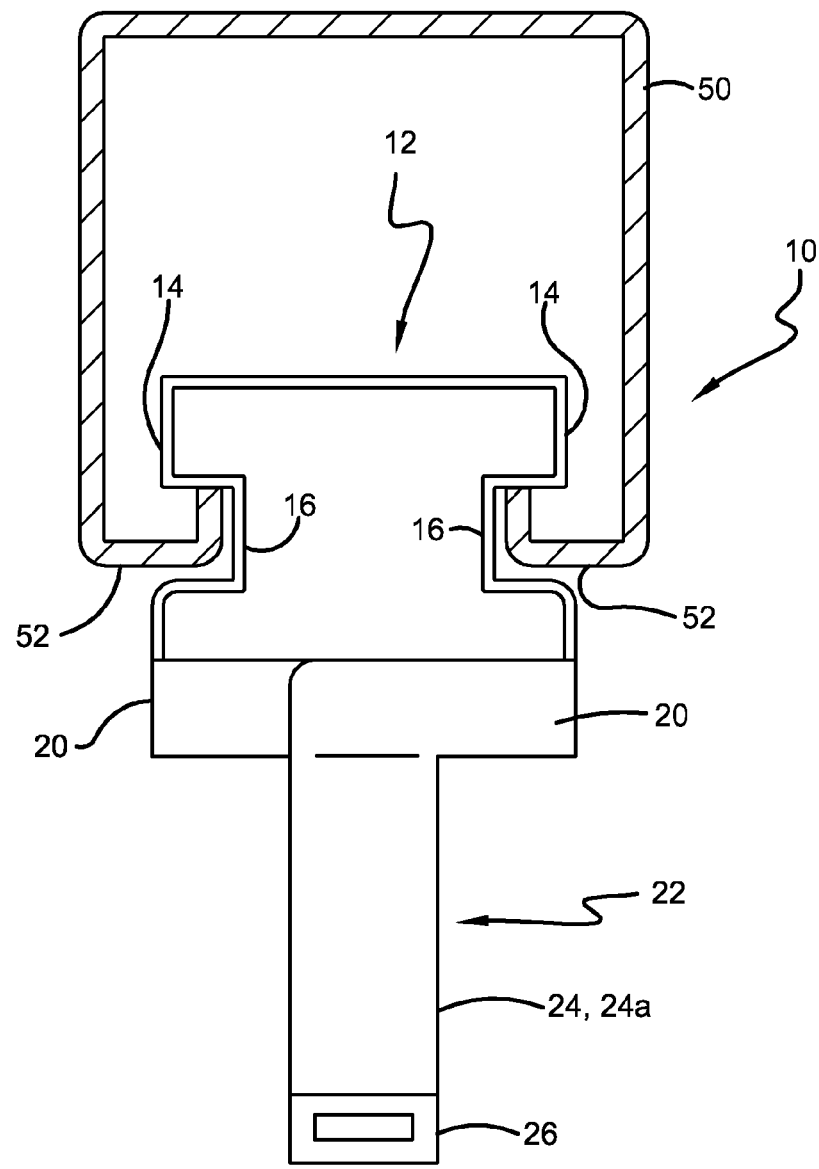
FIG. 2 is a side end view of the pipe hanger shown in FIG. 1, shown in suspended engagement with a strut or beam.

Suspending portion 12 is generally formed and shaped for engaging a desired support structure from which pipe hanger 10 suspends. For example, the suspending portion 12 of FIG. 1 comprises an I-shaped cross-section for engaging a strut 50, or any other support structure 50, such as is shown in FIG. 2. It is also recognized that suspending portion 12 may form a T-shaped structure for use with the strut 50. Accordingly, suspending portion 12 may form any cross-sectional shape adapted for engaging a desired support structure 50, which may include without limitation a T-shaped or arbitrarily shaped cross-section. Suspending portion 12 may comprise any shape so to be capable of engaging and suspending pipe hanger 10 from any structure 50, whether a strut, beam, joist, or any other desirous structure. The pipe hanger 10 may be formed monolithically or each component of the pipe hanger may be formed independently and then assembled together. The pipe hanger 10 components may be formed of any desired material having sufficient strength and rigidity to suspend the objects desired. Such material may be electrically non-conductive.

Figure 3:
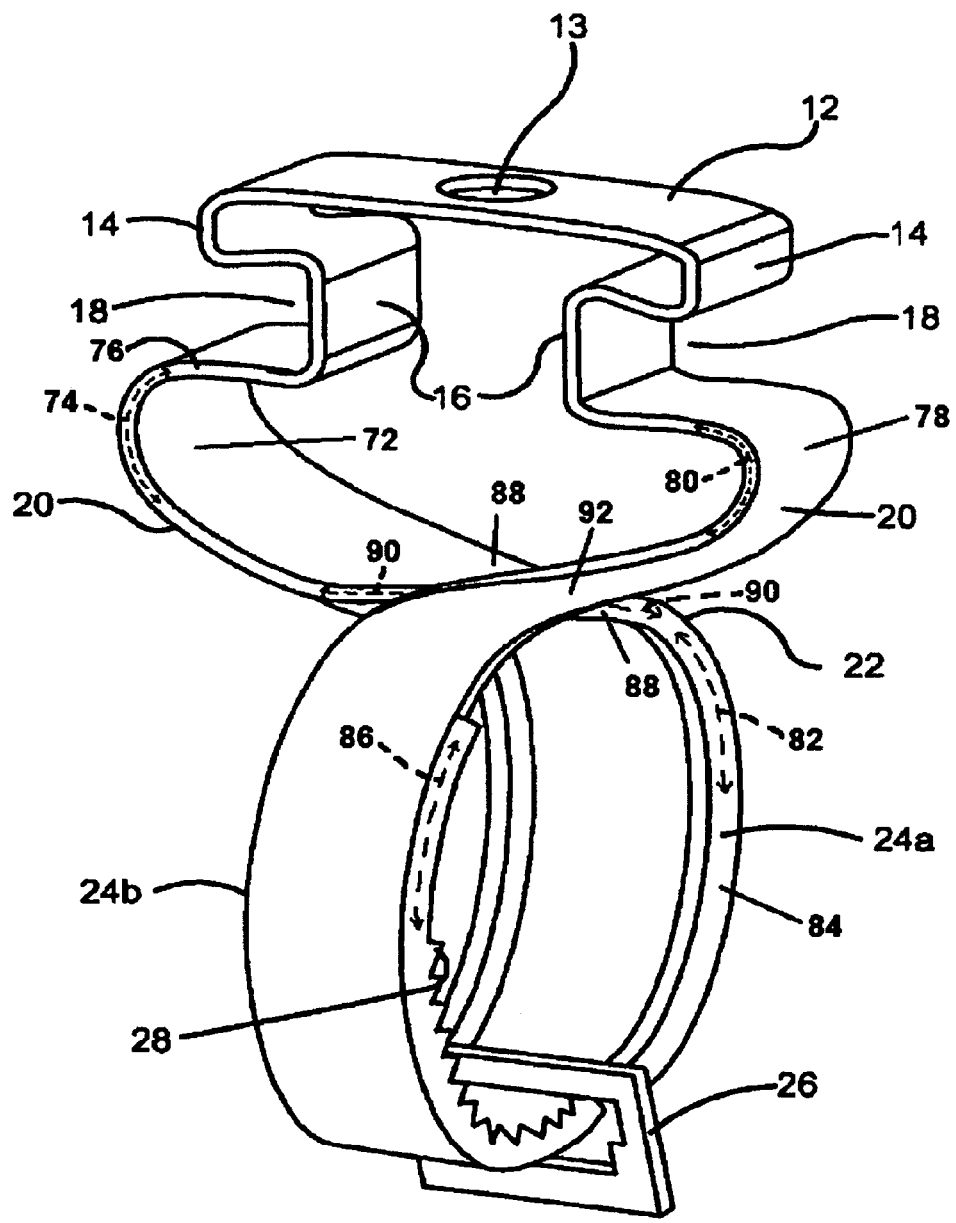
FIG. 3 is a perspective view of an alternative embodiment of the pipe hanger shown in FIG. 1.
Figure 4:
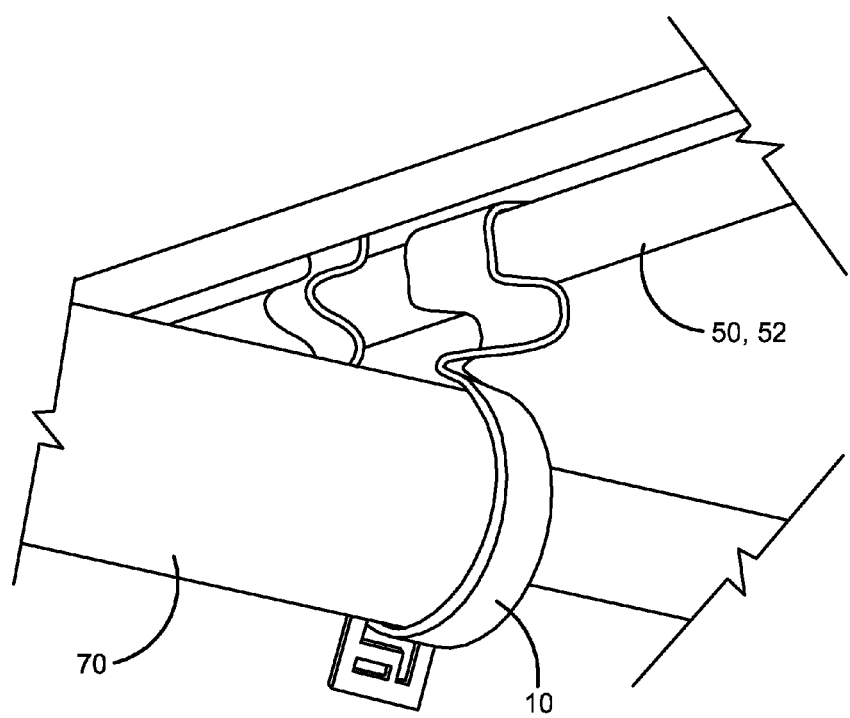
FIG. 4 is a perspective view of the pipe hanger shown in FIG. 3 in use.

In the embodiment of FIGS. 1-3, suspending portion 12 is shaped to engage a strut 50 having laterally spaced and inwardly extending projections or flanges 52, and, therefore, portion 12 includes opposing outwardly extending flanges 14 and recesses 18 positioned below each flange 14. Each recess 18 is bounded by an interior surface 16. Flanges 14 are designed and shaped to rest upon, or otherwise engage, the suspending structure. In some embodiments, flanges 14 are designed to squeeze the strut 50 in a positive engagement. Recesses 18 are provided to accept a portion of the suspending structure, such as a flange 52 of strut 50 in FIG. 2. With continued reference to FIG. 2, the height of each recess 18 may be less than the thickness of the strut or beam flange 52 (or any other object that it receives), so that the pipe hanger 10 squeezes or grips the flange 52 or structure 50 from which it is suspended as press fit. Still, in other variations, it is understood that the height of recesses 18 may be greater than the thickness of any flange 52 or other received object. Suspending portion 12 may be formed as a solid or hollow structure, or may instead be formed by a material having a desired thickness that outlines the shape of portion 12, such as is shown by example in FIGS. 1-8. Extending between suspending portion 12 and retaining portion 22 is at least one extension portion 20. In the FIGURES, two (2) extensions are shown, but it is understood that one or more than two extensions 20 may be used.

Extensions 20 may be formed monolithically with suspending portion 12 and/or retaining portion 22, or may be attached to either to form a unitary structure by any known means, such as by use of mechanical interference (tabs, slots, etc,), adhesives, welding, molding, heating, or fasteners. In still other embodiments, a modular suspending pipe hanger 10 is provided, where any suspending portions 12, having a desired shape or design, may be selectively attached to any desirous retaining portion 22, which has any desired design or shape. Attachment may be provided by any known means, where such means may be molded into one or both of the portions 12, 22, or may be achieved by use of a fastener, clamp, or the like. Removable attachment between portions 12, 22 may be provided. Accordingly, a modular system is provided where different suspending and retaining portions 12, 22 may be assembled to form a desired suspending pipe hanger 10.

Retaining portion 22 generally forms an aperture 30 through which one or more suspended objects 70 extend. A suspended object 70 may comprise, for example, conduit, cable, wire, or pipe, and in particular embodiments, any sized EMT, Rigid, IMC, PVC, FMC conduit, and any size MC and AC cable. In the embodiment of FIGS. 1-3, the retaining portion 22 generally forms an aperture 30. Aperture 30 may be generally cylindrical, as shown by example in FIGS. 1-3, or may comprise any other desired cross-sectional shape, such as, without limitation, a square, rectangle, or oval. Retaining portion 22 may be formed of one or more segments 24, which together generally capture the retained object within pipe hanger 10. In FIG. 1, two segments 24a, 24b are shown, each of which attach in some manner to secure the retained object within pipe hanger 10.

Figure 5:
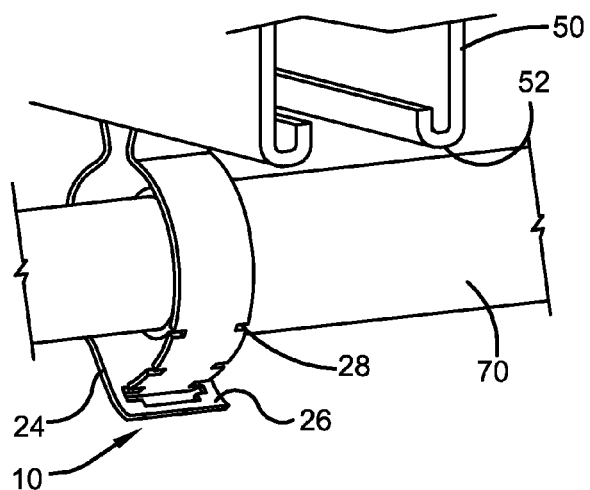
FIG. 5 is a perspective view of an alternative embodiment of the pipe hanger shown in FIG. 1.
Figure 6:
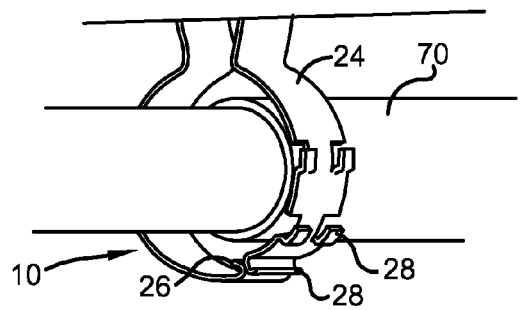
FIG. 6 is a perspective view of an alternative embodiment of the pipe hanger shown in FIG. 1.
Figure 7:
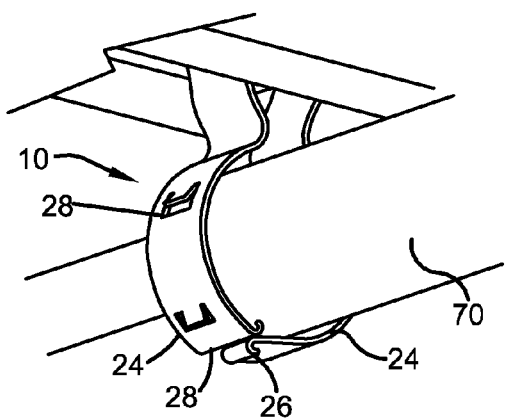
FIG. 7 is a perspective view of an alternative embodiment of the pipe hanger shown in FIG. 1.
Figure 8:
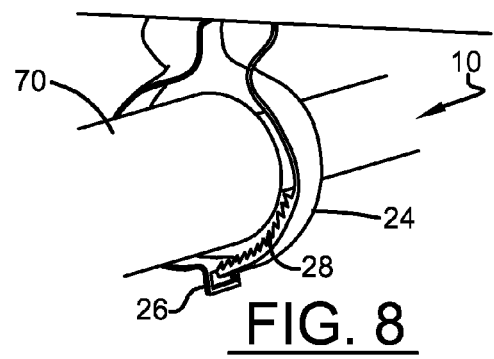
FIG. 8 is a perspective view of device shown in FIG. 3.

In the embodiment of FIG. 1, segment 24a includes a receptor 26 for receiving a portion of segment 24b and any associated connecting portion 28. In the embodiment of FIG. 1, segment 24b includes a connecting portion 28 that comprises a plurality of teeth 28, which engage receptor 26 when segment 24b extends through receptor 26 to provide a removable connection between segments 24a, 24b. Receptor 26 engages interfering features 28 positioned on the other segment 24b. It does not matter which segment 24a, 24b has the receptor, and which has interfering features 28. In the embodiments of FIGS. 1-3, interfering features 28 comprise a plurality of teeth. By providing a plurality of teeth 28, the segments 24 may be adjustably connected to adjust the size of aperture 30 of retaining portion 22 as desired according to the size and quantity of objects being retained therein. By example, other interfering features and segment connecting structures may be used to removably and/or adjustably connect segments 24, such as those shown in FIGS. 5-7. In FIG. 5, features 28 comprise a plurality of notches, while in FIGS. 6-7, receptor is a hook-shaped clasp, which may engage a mating clasp positioned on the adjacent segment or protrusions or apertures positioned along further lengths of the adjacent segment. Still, is it contemplated that fasteners, clamps, adhesives, and other known means may be used to connect (permanently, temporarily, adjustably, or removably) segments 24.

When pipe hanger 10 provides a single segment 24, such segment 24 may engage a receptor 26 attached to another part of pipe hanger 10, such as, without limitation, a suspension portion 12 or an extension 20.

In use, suspending portion 12 may be placed along or within a desired structure from which pipe hanger 10 will suspend. For example, pipe hanger 10 may extend from a strut 50 as shown in FIG. 2. In such instance, portion 12 may be placed within the bottom opening of strut 50, where the flanges 14 of pipe hanger 10 extend in an axial or lengthwise direction of strut 50. Once suspending portion 12 is sufficiently within strut 50, a user simply rotates pipe hanger 10 such that suspending portion 12 engages the flanges 52 of strut 50, such shown in FIG. 2. An object 70 to be retained may be placed within retaining portion 22, and the one or more segments 24 may be securely closed. The size of retaining portion 22 may be adjusted to accommodate and/or clamp the object(s) retained within portion 22.

FIG. 3 shows an embodiment in which the extension portion 20 includes a first portion 72 that extends along a first path 74 (shown in dash line) that is arcuate in a first plane. The "first plane" is the plane defined by the side-edge surface 76 of the first portion 72. FIG. 3 also shows that the extension portion 20 also includes a second portion 78 that extends along a second path 80 (shown in dash line) that is also arcuate in the first plane. FIG. 3 shows that the first and second portions are mirror-shaped with respect to one another. In FIG. 3, the first segment 24a extends along a third path 82 (shown in dash line) that is arcuate in a second plane that is transverse to the first plane. The "second plane" is the plane defined by the side-edge surface 84 of the first segment 24a. The second segment 24b extends along a fourth path 86 (shown in dash line) that is arcuate in the second plane. FIG. 3 shows that the first portion 72 and the first segment 24a merge along a third portion 88 that is cohabitant to both the first portion 72 and the first segment 24a. The first portion 72 and first segment 24a are integrally formed and thus to dwell with another or share the same place over what is designated as the third portion 88. As shown in FIG. 3, the third portion 88 extends along a fifth path 90 (shown in dash line) that is continuously arcuate between the first and second planes. The second portion 78 and the second segment 24b merge along a fourth portion 92 cohabitant to both the second portion 78 and the second segment 24b. Like the third portion, the fourth portion 92 extends along a path that is continuously arcuate between the first and second planes.

Figure 9:
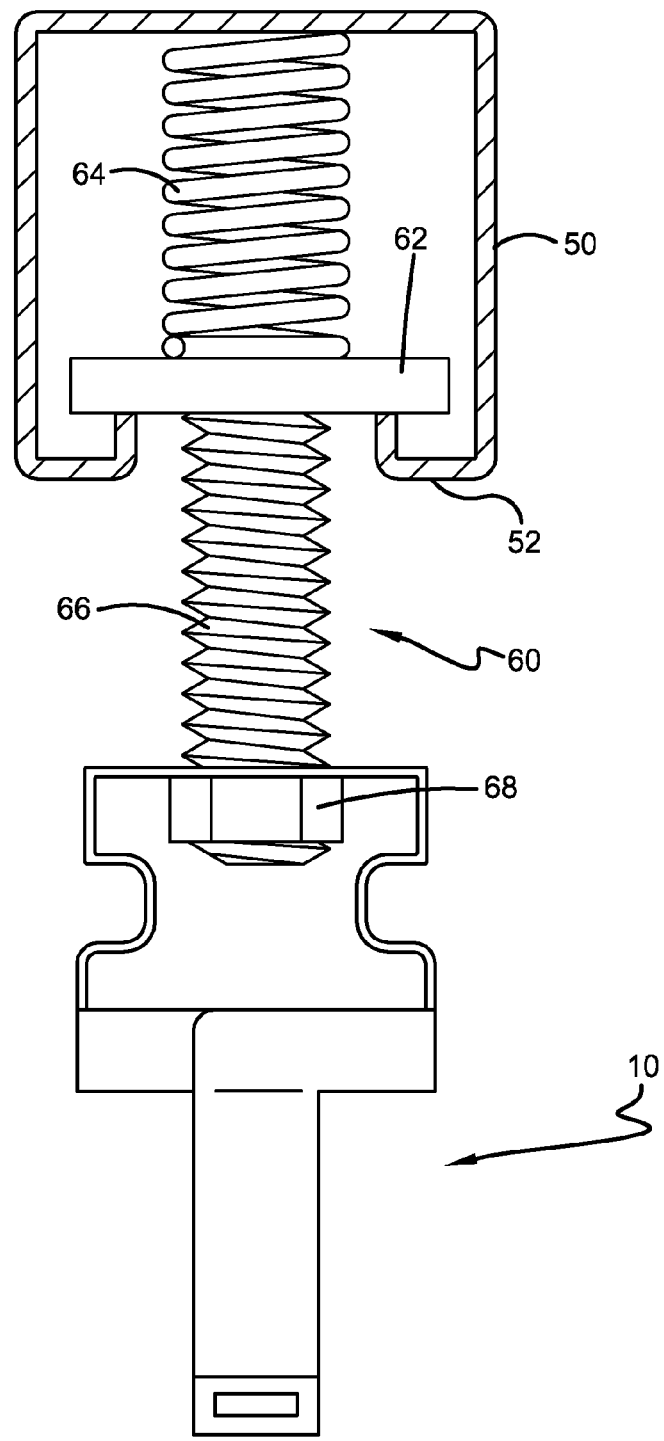
FIG. 9 is a side end view of an alternative embodiment of the pipe hanger shown in FIG. 1.
Figure 10A:
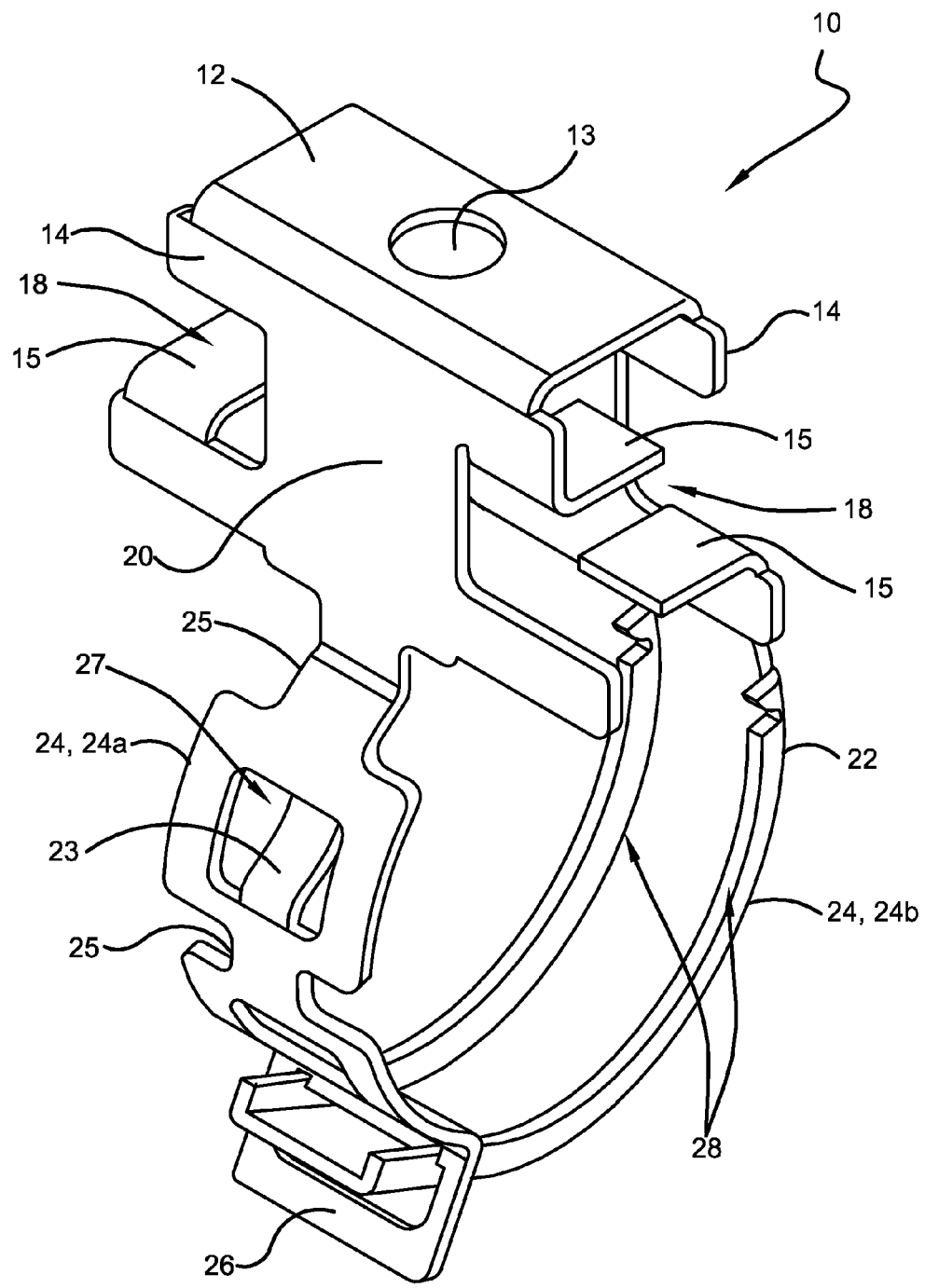
FIG. 10A is a perspective view of a pipe hanger in accordance with an embodiment of the present invention.
Figure 10B:
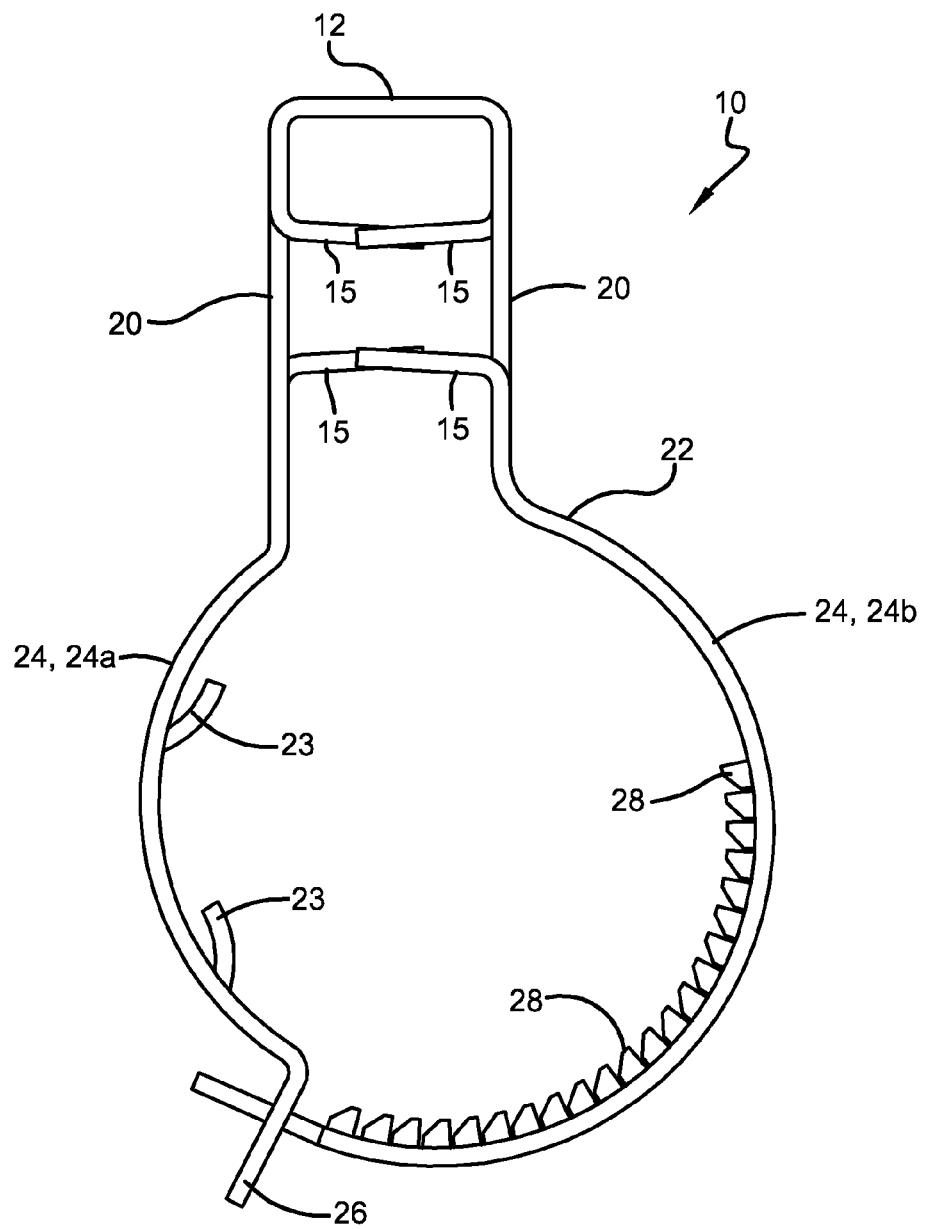
FIG. 10B is a side view of the pipe hanger shown in FIG. 10A.
Figure 10C:
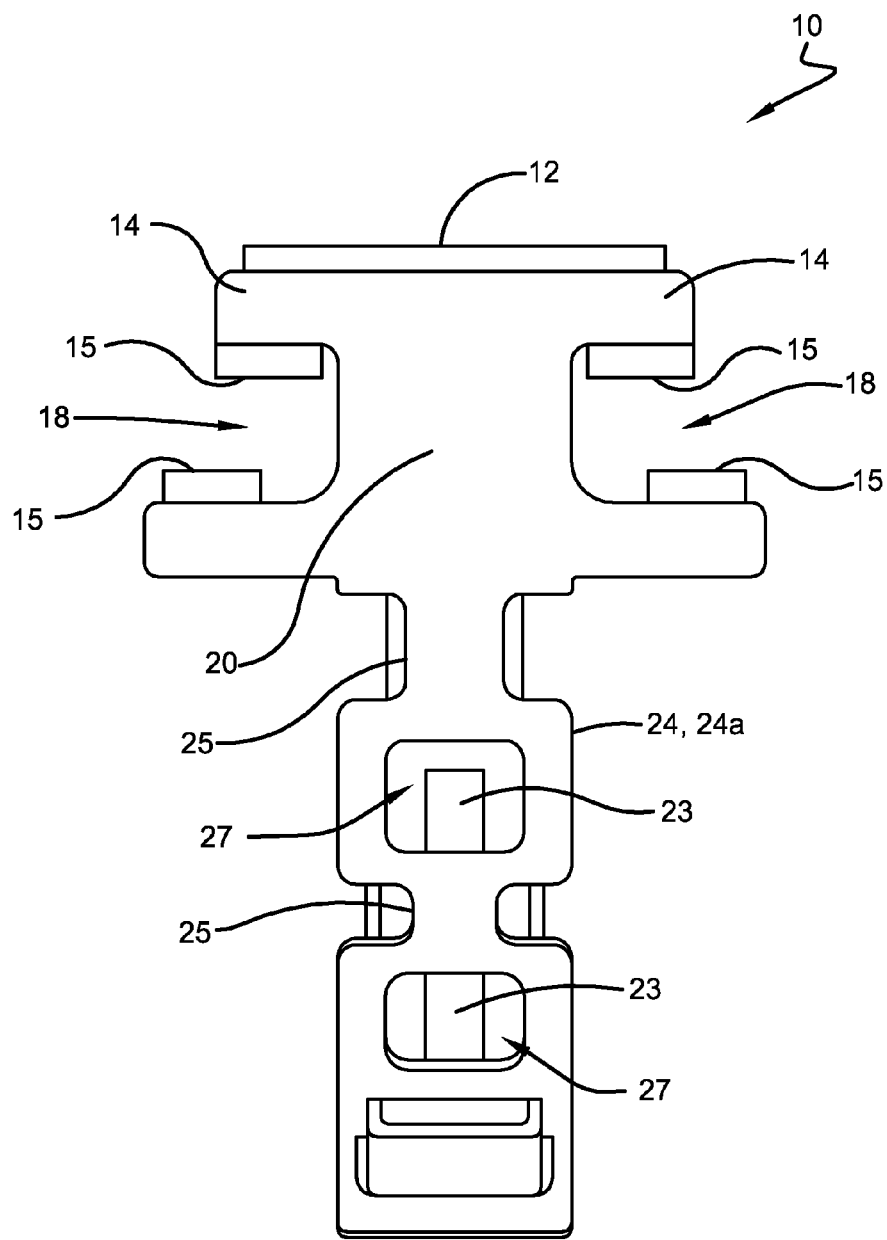
FIG. 10C is a front view of the pipe hanger shown in FIG. 10A.
Figure 10D:
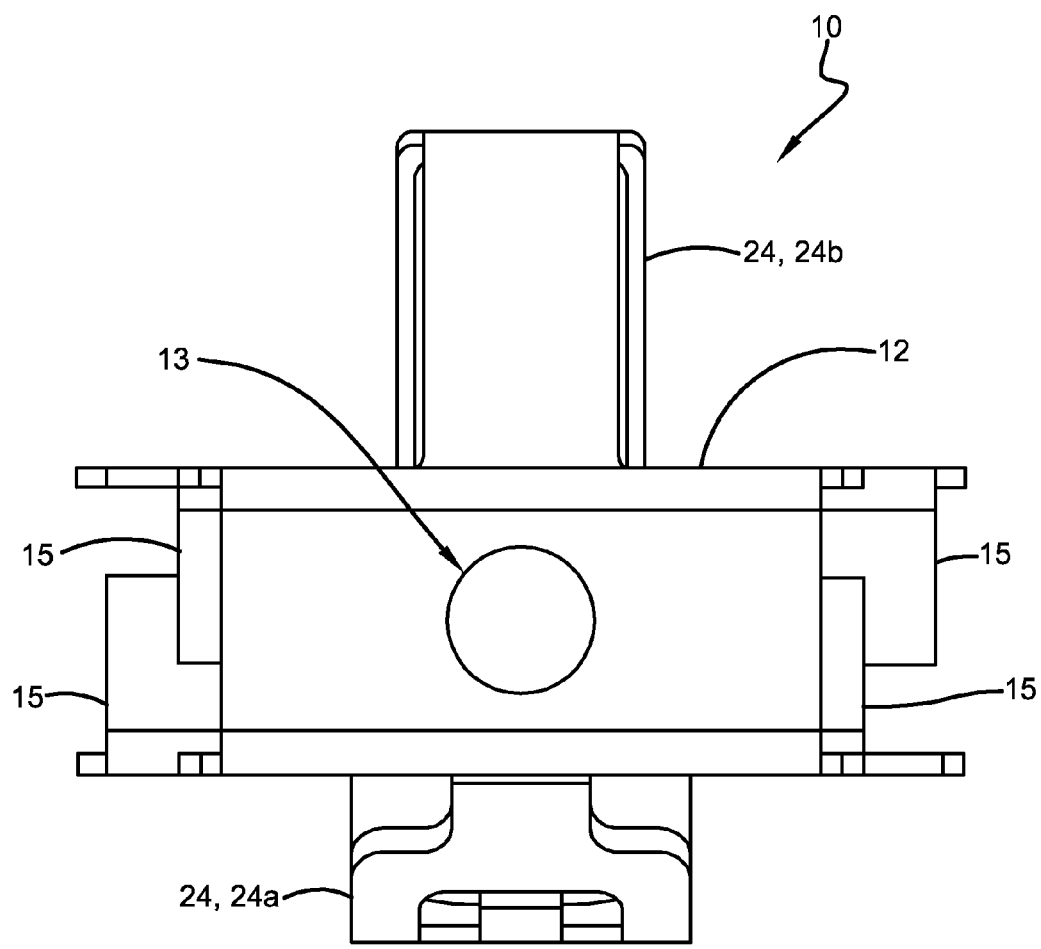
FIG. 10D is a top view of the pipe hanger shown in FIG. 10A.
Figure 11:
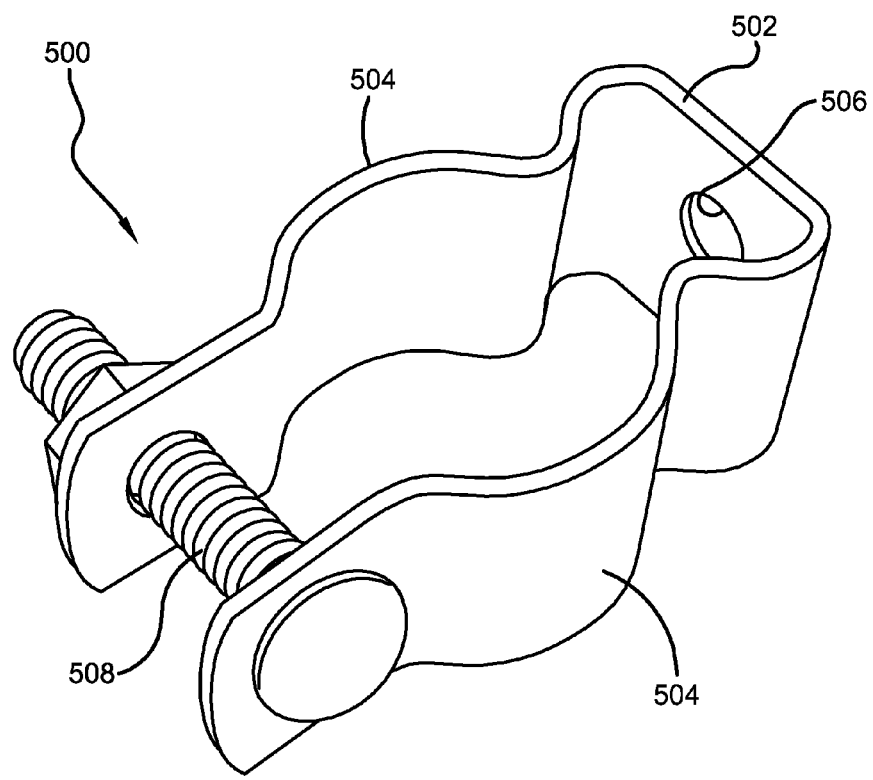
FIG. 11 is a perspective view of a known pipe hanger.

With reference to FIG. 9, it is understood that pipe hanger 10 may suspend at lower heights relative to structure 50 by use of an extension 60. Any extension 60 comprising any mechanism or structure may be used. By way of example, with reference to FIG. 9, extension 60 may comprise a threaded shaft 66 that extends from a base 62 and attaches to pipe hanger 10 by aperture 13 located atop suspending portion 12 (see FIGS. 1 and 3). Any means of attaching extension 60 to pipe hanger 10 may be employed, such as by a nut 68. In the embodiment shown, base 62 may be placed atop flanges 52, and may be secured in place by a spring 64. In other variations, base 62 may be designed to grasp flanges 52 or engage another feature of structure 50 for the purpose of securing base to structure 50.

With reference to FIGS. 10A, 10B, 10C, and 10D, the pipe hanger 10 may include a suspending portion 12 and a retaining portion 22. The pipe hanger 10 may include an aperture 13 located on top of the suspending portion 12. The pipe hanger 10 may include outwardly extending flanges 14 and recesses 18 positioned below each flange 14 on the suspending portion 12. The pipe hanger 10 may include one or more segments 24 on the retaining portion 22. The pipe hanger 10 may include one or more extension portions 20 extending between the suspending portion 12 and the retaining portion 22. The retaining portion 22 may include two segments 24a, 24b, as shown. Segment 24a may include a receptor 26 for receiving a portion of segment 24b and any associated connecting portion 28. In the embodiment shown, segment 24b includes a connecting portion 28 that comprises a plurality of teeth 28, which engage receptor 26 when segment 24b extends through receptor 26 to provide a removable connection between segments 24a, 24b. The pipe hanger 10 may include alternate strut mount flanges 15, which reduce the amount of material required. The segment 24a may include one or more necked portions 25, which allow the segment 24a to flex with less force when closing around the pipe or conduit. The pipe hanger 10 may include one or more spring tabs 23, which assist in securing the pipe or conduit within the pipe hanger 10 and allow the pipe hanger 10 to accommodate a large range of diameters. The segment 24a may include one or more apertures 27. The pipe hanger 10 can be fanned of spring steel. In one embodiment, the pipe hanger 10 is formed of AISI 1050 steel, which is heat treated to 25-30 Rc and then finished with a zinc electroplate per ASTM B633 Type 2, Class 2 Yellow Chromate.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A pipe hanger for use with an associated support structure that comprises first and second laterally spaced and inwardly extending projections; the pipe hanger comprising:
    a suspending portion comprising: a body; first and second flanges that extend outwardly from the body; and, third and fourth flanges that extend outwardly from the body and below the first and second flanges respectively to define first and second recesses therebetween, wherein the first and second recesses are operable to receive the first and second projections of the associated support structure to suspend the pipe hanger from the associated structure without the use of fasteners;
    a retaining portion supported to the body and comprising first and second segments that together form an aperture that is operable to receive the first associated object, wherein the first and second segments are adjustably connectable to each other to adjust the size of the aperture to accommodate different sized associated objects; and
    an extension portion attached to the body and positioned between the suspending portion and the retaining portion, wherein the extension portion includes a first portion that extends along a first path that is arcuate in a first plane, wherein the extension portion includes a second portion that merges with the second segment and extends along a second path that is also arcuate in the first plane with the first and second portions being mirror-shaped with respect to one another, wherein the first segment extends along a third path that is arcuate in a second plane that is transverse to the first plane, wherein the second segment extends along a fourth path that is arcuate in the second plane, wherein the first portion and the first segment merge along a third portion cohabitant to both the first portion and the first segment, wherein the third portion extends along a fifth path that is continuously arcuate and extends between the first and second planes, wherein the second portion and the second segment merge along a fourth portion cohabitant to both the second portion and the second segment, and wherein the fourth portion extends along a sixth path that is continuously arcuate and extends between the first and second planes.

2. The pipe hanger of claim 1 wherein the retaining portion further comprises:
    a connecting portion; and
    a receptor releasably receiving the connecting portion.

3. The pipe hanger of claim 2 wherein the connecting portion further comprises:
    a plurality of teeth, each operable to engage the receptor.

4. The pipe hanger of claim 1 wherein the suspending portion and the retaining portion and the extension portion are formed monolithically.

5. The pipe hanger of claim 1 wherein the suspending portion and the retaining portion and the extension portion are formed from a material that is electrically non-conductive.

6. The pipe hanger of claim 1 wherein the suspending portion and the retaining portion and the extension portion are formed from spring steel.

7. The pipe hanger of claim 1 wherein the suspending portion and the retaining portion and the extension portion are formed from AISI 1050 steel and includes a zinc electroplate per ASTM B633 Type 2, Class 2 Yellow Chromate.

* * * * *